Dec. 27, 1966  T. H. ELLIS  3,295,101
VEHICLE EMERGENCY FLARE
Filed May 27, 1964
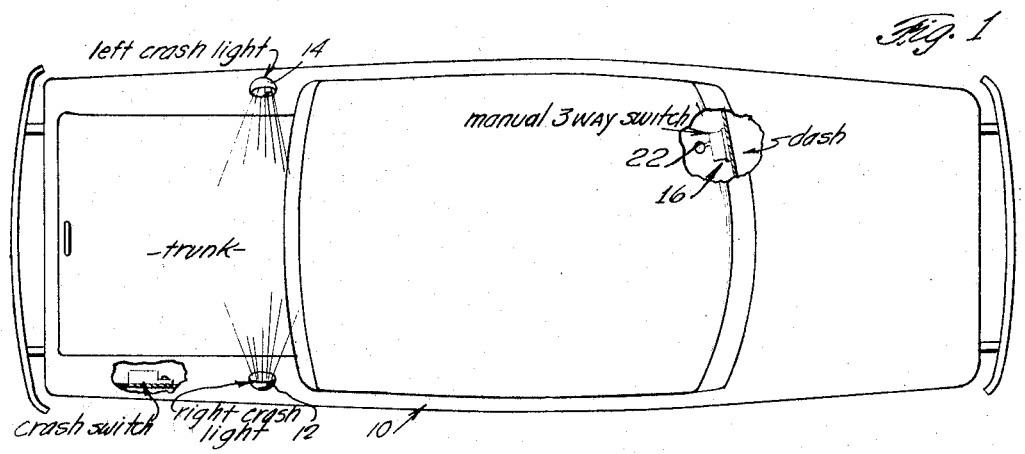
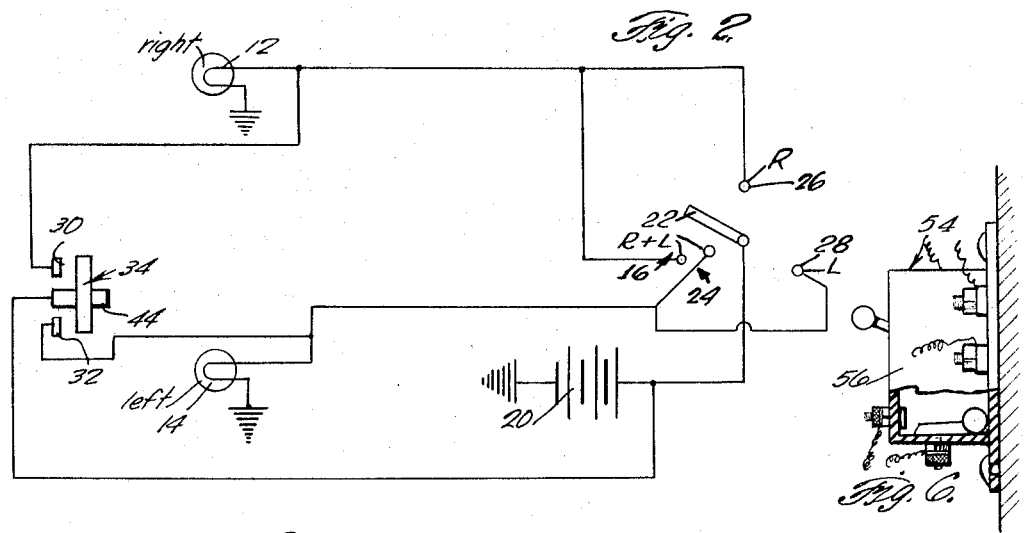
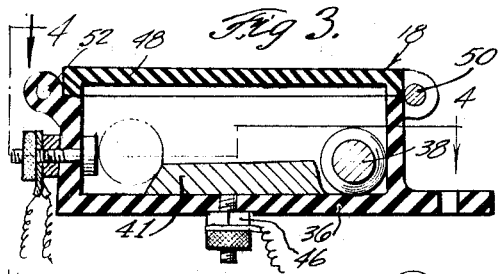
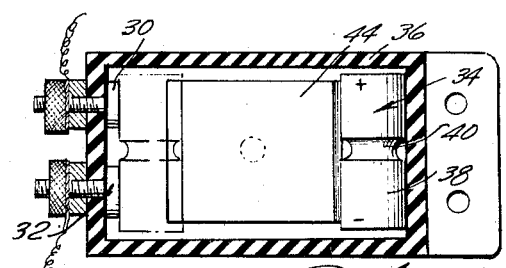
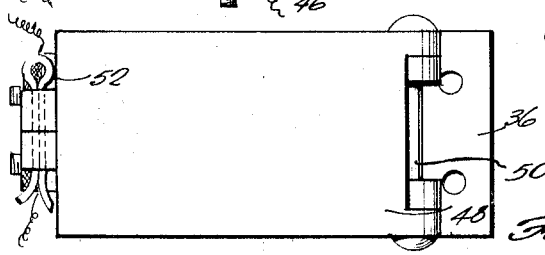
INVENTOR.
THOMAS H. ELLIS
BY
Victor J. Evans & Co.
Attorneys

United States Patent Office 3,295,101
Patented Dec. 27, 1966

3,295,101
VEHICLE EMERGENCY FLARE
Thomas H. Ellis, 10740 Cushdon Ave.,
Los Angeles, Calif. 90964
Filed May 27, 1964, Ser. No. 370,561
3 Claims. (Cl. 340—54)

The present invention generally relates to a vehicle light assembly and more particularly to an emergency flare that is energized from the storage battery of the vehicle electrical system and which is operated either manually or automatically in the event the vehicle is involved in a crash.

When accidents occur on present highways and especially super highways, toll roads, freeways, and the like, it is usually necessary for a passing motorist to take the next exit road and find a telephone in order to notify law enforcement officials thus necessitating considerable delay before police arrive and sometimes considerable delay before an ambulance or other necessary emergency vehicle arrives. This also is the situation when assistance is needed such as in the event of mechanical failure, flat tire or the like. When a police car arrives, he usually finds that it is necesary to light conventional combustible flares and place them at proper locations so that oncoming drivers will be warned thus requiring a considerable expenditure of time on the part of the person lighting the flares and exposing him to danger of approaching vehicles. Accordingly, it is the primary object of the present invention to provide a vehicle emergency flare that is electrically operated which may be operated from a manual switch placed conveniently on the dashboard, steering column or the like so that the operator of the vehicle may energize either the right hand or left hand flare or both flares simultaneously and the flares also may be energized by a crash switch which will close the electrical system to both flares in the event the vehicle is engaged in an accident and the driver is unable to operate the manual switch.

Another object of the present invention is to provide a vehicle emergency flare assembly that has many utilitarian purposes including the use as a warning to other drivers of impending danger and the emergency flare of the present invention is simple to install, easy to operate, safe and generally inexpensive to manufacture.

These and other objects of the present invention will be more fully realized and understood from the following detailed description when taken in conjunction with the accompanying drawing wherein:

FIGURE 1 is a top plan view of a vehicle with the electric emergency flare of the present invention incorporated therein;

FIGURE 2 is a schematic wiring diagram illustrating the electrical circuitry for the present invention;

FIGURE 3 is a sectional view of the crash switch illustrating the structural details thereof;

FIGURE 4 is a sectional view taken substantially upon a plane passing along section line 4—4 of FIGURE 3 illustrating further structural details of the switch;

FIGURE 5 is a top plan view of the switch; and

FIGURE 6 is an elevational view with portions broken away illustrating a combined manual and crash switch.

Referring now specifically to the drawings, the numeral 10 generally designates a vehicle such as an automobile including a right hand light 12 and a left hand light 14 which are preferably mounted on the rear deck of the automobile near the rear window along each side of the trunk with the lights facing upwardly so that the light beams will intersect above the vehicle and also facing slightly rearwardly so that the light beams will be visible from the rear. A three-way manual switch 16 is mounted in the vehicle for operation by the operator of the vehicle such as in a convenient position on the dashboard or the like for operating either of the lights 12 and 14 independently or both lights together. A crash switch 18 is mounted on the vehicle in any suitable location for operation to energize the lights 12 and 14 in the event of a crash. The crash switch may be located on the rear or in the front of the vehicle or in any other suitable location.

As illustrated in FIGURE 2, the lights 12 and 14 are energized from the battery 20 with the toggle switch 16 including a manually movable arm 22 for energizing the right and left hand lights when engaged with contacts 24, the right hand light only when engaging a contact 26 and the left hand light only when engaging a contact 28. The lights 12 and 14 are also connected to contacts 30 and 32 that are engaged by a switching element 34 forming part of the crash switch 18 so that when the switching element 34 that is electrically connected to the battery engages the contacts 30 and 32, both of the lights 12 and 14 will be energized.

FIGURES 3, 4, and 5 disclose in more details the construction of the crash switch including a body of insulating material 36 having a roller 38 disposed therein with the roller having a peripheral central groove 40 therein. An upstanding projection or base 42 is provided in the insulated housing 36 and the base 44 is terminated in spaced relation to the ends of the housing so that the contract roller 38 which forms the contact member 34 in FIGURE 2 normally is retained in spaced relation to the contacts 32 and 30 which are electrically connected to the lights respectively and the base 44 is electrically connected to the battery through a contact or terminal member 46 whereby the roller element 38 forms a switch so that as it rolls longitudinally in the insulated body 36, the roller will make contact with the contacts 30 and 32 thus energizing both lights by completing the circuit from the battery through the base member 44 which is metallic and conductive to the contacts 30 and 32 and then to the lights 12 and 14. The insulated body 36 includes a top or cover 48 hinged thereto at one edge by hinge pin 50 and detachably locked in place by a removable fastener 52 such as a cotter pin.

FIGURE 6 illustrates a modified structure in which there is a combined manual and crash switch 54 and which the crash switch and manual switch are located in the same insulated housing or casing 56. This simplifies the structure of the invention and makes for easier installation of the switch construction for the lights 12 and 14.

If the driver of the vehicle has motor or tire trouble, he can close the manual switch to both lights and traffic can swerve around him. In case of hitting another car and rupture of the gas tank, the lights may be easily turned on. By orientating the automatic switch longitudinally in the vehicle, abrupt deceleration will cause the crash switch to energize both of the lights. Various types of manual toggle switches may be employed and the lights themselves are relatively inexpensive and the switch lever or arm that is manually operated may be spring biased to return to a neutral position so that the lights will not accidentally be left on. Although it is not necessarily desirable, a blinker system may be incorporated into the flare arrangement to further draw attention to the existence of an emergency for rendering the operation of a vehicle safer and reducing rearend pile-up collisions which are rather frequent on present-day highways.

As a further precaution against any intermittent breaking of the circuit with the contacts 30 and 32, the roller 38 is magnetized and the poles thereof are designated in FIG. 4 of the drawing.

The principles of the invention explain in connection with the specific exemplifications thereon will suggest many other applications and modifications of the same.

It is accordingly desired that, in construing the breadth of the appended claims they shall not be limited to the specific details shown and described in connection with the exemplifications thereof.

What is claimed is:

1. In a combination with a passenger-type automobile, a pair of emergency lights mounted on a portion of the top surface thereof and each for projecting a light beam upwardly, inwardly and rearwardly when illuminated, one of the lights being adjacent the left side of the vehicle and another of the lights being adjacent the right side of the vehicle, manual switch means for selectively operating each of the lights and for operating both of the lights simultaneously, a crash switch operated by inertia for operating both of the lights in the event of a collision thereby warning oncoming motorists of dangerous conditions and forming a signal to law enforcement officials of the existence of an accident or emergency condition, said crash switch including an insulating body, a roller movably mounted in said body for movement into engagement with a pair of contacts electrically connected to said lights, a stationary contact member connected electrically to a source of electrical energy whereby the battery is normally disconnected from the lights, said movable roller being constructed of conductive material and disposed within the body for movement in response to a sudden and abrupt deceleration whereby the forces of inertia keep the roller moving in the manner in which it was thereby causing the roller to move to bridge the contacts in the casing to electrically connect the battery to said lights.

2. The structure as defined in claim 1 wherein said manual switch includes a three-position switch for connecting the battery to either of the lights independently or to both of the lights simultaneously.

3. The structure as defined in claim 2 wherein each of said lights has a colored lens for providing an easily noticed danger signal.

References Cited by the Examiner

UNITED STATES PATENTS

| | | | |
|---|---|---|---|
| 2,652,553 | 9/1953 | Hollins | 340—81 |
| 2,972,134 | 2/1961 | McKay | 340—262 X |
| 3,114,015 | 12/1963 | Magazanik | 340—74 X |

NEIL C. READ, *Primary Examiner.*

A. H. WARING, *Assistant Examiner.*